(12) United States Patent  (10) Patent No.: US 8,055,435 B2
Okumura et al.  (45) Date of Patent: Nov. 8, 2011

(54) CONTROL DEVICE FOR INTERNAL COMBUSTION ENGINE

(75) Inventors: Daichi Okumura, Susono (JP); Atsuharu Ota, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 225 days.

(21) Appl. No.: 12/601,105

(22) PCT Filed: Jun. 10, 2008

(86) PCT No.: PCT/JP2008/060926
§ 371 (c)(1),
(2), (4) Date: Nov. 20, 2009

(87) PCT Pub. No.: WO2009/011192
PCT Pub. Date: Jan. 22, 2009

(65) Prior Publication Data
US 2010/0154761 A1    Jun. 24, 2010

(30) Foreign Application Priority Data
Jul. 19, 2007    (JP) .................................. 2007-188726

(51) Int. Cl.
*F02D 41/00* (2006.01)
*F01L 1/34* (2006.01)

(52) U.S. Cl. ..................... 701/108; 123/90.15; 123/443; 123/568.21; 123/676

(58) Field of Classification Search ............... 123/90.15, 123/568.21, 435, 676, 681, 443, 302, 308, 123/345–348; 701/108, 110; 60/276
See application file for complete search history.

(56) References Cited

U.S. PATENT DOCUMENTS

| 5,463,995 | A |   | 11/1995 | Sakai et al. |
| 6,135,088 | A | * | 10/2000 | Duret .............................. 123/430 |
| 6,425,369 | B2 | * | 7/2002 | Arai et al. ...................... 123/348 |
| 6,553,959 | B2 | * | 4/2003 | Xu et al. ......................... 123/295 |
| 6,955,144 | B2 | * | 10/2005 | Sakai et al. ................. 123/90.11 |
| 7,565,899 | B2 | * | 7/2009 | Kolmanovsky et al. ...... 123/481 |
| 2001/0037797 | A1 |   | 11/2001 | Arai et al. |
| 2001/0050070 | A1 |   | 12/2001 | Xu et al. |

FOREIGN PATENT DOCUMENTS

| DE | 100 02 486 | 7/2001 |
| EP | 0 607 992 | 7/1994 |
| EP | 1 106 792 | 6/2001 |
| JP | 61 62207 | 4/1986 |
| JP | 7 224626 | 8/1995 |

(Continued)

OTHER PUBLICATIONS

Office Action issued Dec. 28, 2010, in Japan patent application No. 2007-188726.

*Primary Examiner* — Hai Huynh
(74) *Attorney, Agent, or Firm* — Oblon, Spivak, McClelland, Maier & Neustadt, L.L.P.

(57) ABSTRACT

In a low load region where torque is lower than T1 but is not lower than T2, the present invention uses a lean single valve small operating angle mode to provide a lean burn in a single valve small operating angle state or uses an EGR single valve small operating angle mode to provide external EGR in a single valve small operating angle mode.

6 Claims, 7 Drawing Sheets

FOREIGN PATENT DOCUMENTS

| | | |
|---|---|---|
| JP | 8 61031 | 3/1996 |
| JP | 8-240139 | 9/1996 |
| JP | 11-336574 | 12/1999 |
| JP | 2002-54483 | 2/2002 |
| JP | 2003-293802 | 10/2003 |
| JP | 2007 16766 | 1/2007 |
| JP | 2007-113470 | 5/2007 |
| JP | 2009 191703 | 8/2009 |

* cited by examiner

CONTROL DEVICE FOR INTERNAL COMBUSTION ENGINE

TECHNICAL FIELD

The present invention relates to a control device for an internal combustion engine.

BACKGROUND ART

A variable valve train disclosed in Japanese Patent Laid-open No. 2007-16766 (refer, for instance, to Paragraphs 0047 to 0049) is a variable valve train for an internal combustion engine that has two intake valves per cylinder. This variable valve train is capable of switching between a dual valve variable control state, in which the operating angles of both intake valves are continuously variable, and a single valve variable control state, in which the operating angle of one intake valve is continuously variable while the operating angle of the other intake valve remains large. In a high load, high rotation speed region, this variable valve train enters the dual valve variable control state and exercises control to set both intake valves at a large operating angle. In the other regions, however, this variable valve train enters the single valve variable control state and exercises control so that the operating angle of one intake valve is smaller than that of the other intake valve (refer, for instance, to Paragraph 0069 and FIG. 9).

[Patent Document 1] Japanese Patent Laid-open No. 2007-16766

DISCLOSURE OF THE INVENTION

Problem to be Solved by the Invention

The variable valve train described above can create a great difference between the flow rates of two intake ports by creating a great difference between the operating angles of two intake valves in the single valve variable control state (the resulting state is hereinafter referred to as the "single valve small operating angle state"). As a result, the flow from an intake port having a high flow rate exceeds the flow from the other intake port, thereby producing a swirl in a cylinder. Thus, the swirl can be strengthened to provide combustion improvement in a lean burn or EGR operation.

In the single valve small operating angle state, however, one intake valve is set at a large operating angle. Thus, a large amount of air flows into the cylinder while the throttle valve opening is large. Therefore, while the internal combustion engine having the conventional variable valve train described above is in an extremely low load state, it is necessary to adjust the load by reducing the throttle valve opening. As a result, the pump loss increases to lessen the fuel efficiency improvement effect of the lean burn or EGR operation.

Further, performing a lean burn or EGR operation indiscriminately in a low load state may adversely affect fuel efficiency, warm-up, emissions, and driveability, and the like.

The present invention has been made in view of the above circumstances. An object of the present invention is to provide a control device for an internal combustion engine capable of improving the fuel efficiency of an internal combustion engine having an intake variable valve train that can switch between a dual valve variable control state, in which the operating angles of both intake valves are both variable, and a single valve small operating angle state, in which the operating angle of one intake valve is smaller than that of the other intake valve.

Means for Solving the Problem

First aspect of the present invention is a control device for an internal combustion engine comprising:

an internal combustion engine having a lean burn capability and/or an external EGR capability;

an intake variable valve train capable of switching between a dual valve variable control state, in which the operating angles of a first intake valve and a second intake valve provided for each cylinder of the internal combustion engine are both variable, and a single valve small operating angle state, in which the operating angle of the second intake valve is smaller than the operating angle of the first intake valve;

operating region setup means for setting up at least a high load region, a low load region in which the load is lower than in the high load region, and an extremely low load region in which the load is lower than in the low load region, as a operating region for the internal combustion engine; and operating mode control means for using, in the high load region or the extremely low load region, a stoichiometric dual valve variable control mode to provide combustion at a theoretical air-fuel ratio in the dual valve variable control state, and using, in the low load region, a lean single valve small operating angle mode to provide a lean burn in the single valve small operating angle state or an EGR single valve small operating angle mode to provide external EGR in the single valve small operating angle state.

Second aspect of the present invention is the control device for an internal combustion engine according to the first aspect, further comprising:

temperature acquisition means for detecting or estimating a representative temperature of the internal combustion engine or of a catalyst installed in an exhaust path of the internal combustion engine;

wherein, when the representative temperature is lower than a predetermined temperature, the operating mode control means uses the stoichiometric dual valve variable control mode in the low load region as well.

Third aspect of the present invention is the control device for an internal combustion engine according to the first aspect, further comprising:

temperature acquisition means for detecting or estimating an EGR gas temperature or an intake temperature;

wherein, when the EGR gas temperature or the intake temperature is higher than a predetermined temperature, the operating mode control means uses the stoichiometric dual valve variable control mode in the low load region as well.

Effects of the Invention

The first aspect of the present invention uses, in the high load region or the extremely low load region, the stoichiometric dual valve variable control mode to provide combustion at a theoretical air-fuel ratio in the dual valve variable control state, and uses, in the low load region, the lean single valve small operating angle mode to provide a lean burn in the single valve small operating angle state or the EGR single valve small operating angle mode to provide EGR in the single valve small operating angle state. In the low load region, the lean single valve small operating angle mode and EGR single valve small operating angle mode suffer a smaller cooling loss than the stoichiometric dual valve variable control mode. Thus, the two former modes exhibit a lower specific fuel consumption than the latter mode. Therefore, the fuel efficiency of the low load region can be improved by using the lean single valve small operating angle mode or EGR single valve small operating angle mode in the low load region. In the extremely low load region, on the other hand, the use of the lean single valve small operating angle mode or EGR single valve small operating angle mode requires throttling, thereby increasing the pump loss; therefore, the specific fuel consumption is lower in the stoichiometric dual valve variable control mode. Thus, the fuel efficiency can be further improved by using the stoichiometric dual valve variable control mode in the extremely low load region. As described above, the first aspect of the present invention makes it possible to select the lowest-fuel-consumption operating mode in accordance with the operating region. Consequently, the fuel efficiency can be improved.

The second aspect of the present invention can use the stoichiometric dual valve variable control mode in the low load region as well if the representative temperature of the internal combustion engine or of the catalyst installed in the exhaust path of the internal combustion engine is lower than the predetermined temperature. The combustion temperature and exhaust temperature are lower in the lean single valve small operating angle mode and EGR single valve small operating angle mode than in the stoichiometric dual valve variable control mode. Therefore, if the lean single valve small operating angle mode or EGR single valve small operating angle mode is used in a state where the internal combustion engine and catalyst are not sufficiently warmed up, the warm-up of the internal combustion engine and catalyst may be delayed to adversely affect fuel efficiency, emissions, driveability, and the like. The second aspect of the present invention can absolutely avoid such an adverse effect because it can use the stoichiometric dual valve variable control mode without switching to the lean single valve small operating angle mode or EGR single valve small operating angle mode in a state where the internal combustion engine and catalyst are not sufficiently warmed up.

The third aspect of the present invention can use the stoichiometric dual valve variable control mode in the low load region as well if the EGR gas temperature or intake temperature is higher than the predetermined temperature. If the EGR single valve small operating angle mode or lean single valve small operating angle mode is used while the EGR gas temperature or intake temperature is high, knocking is likely to occur because the intake temperature rises due to intake throttling. The third aspect of the present invention can absolutely avoid EGR knocking because it can use the stoichiometric dual valve variable control mode without switching to the EGR single valve small operating angle mode or lean single valve small operating angle mode while the EGR gas temperature or intake temperature is high.

BEST MODE FOR CARRYING OUT THE INVENTION

First Embodiment

[Description of System Configuration]

Figure 1:
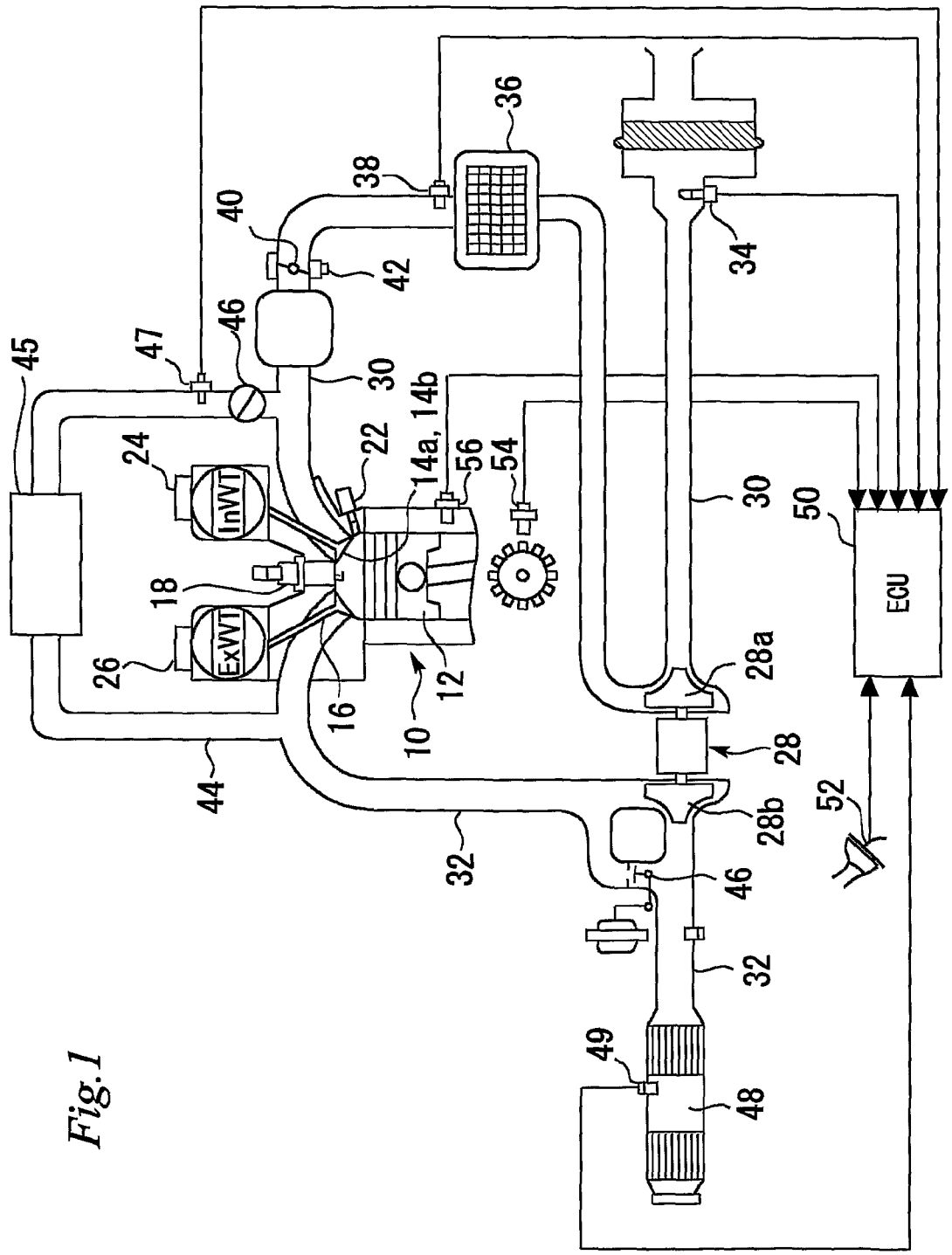
FIG. 1 shows the configuration of a system according to a first embodiment of the present invention.

FIG. 1 shows the configuration of a system according to a first embodiment of the present invention. As shown in FIG. 1, the system according to the first embodiment of the present invention includes a spark-ignition internal combustion engine 10 that is installed, for instance, as a vehicle's motive power source. The number of cylinders in the internal combustion engine 10 and the arrangement of the cylinders are not specifically defined.

Each cylinder in the internal combustion engine 10 has a piston 12, an intake valve 14, an exhaust valve 16, an ignition plug 18, and a fuel injector 22, which injects fuel directly into the cylinder (into a combustion chamber).

The internal combustion engine 10 is a lean burn engine. More specifically, the internal combustion engine 10 can switch between a stoichiometric air-fuel ratio combustion mode, which exercises control so that the in-cylinder air-fuel ratio is close to a stoichiometric air-fuel ratio, and a lean burn mode, which provides an in-cylinder air-fuel ratio that is leaner than the stoichiometric air-fuel ratio.

The internal combustion engine 10 according to the present invention is not limited to a direct injection engine, which is shown in the figure. It may alternatively be a port injection engine, which injects fuel into an intake port, or an engine that provides both direct injection engine and port injection.

The internal combustion engine 10 has two intake valves 14 per cylinder. If the two intake valves 14 need to be distinguished from each other in the subsequent explanation, they will be referred to as a first intake valve 14a and a second intake valve 14b, respectively.

The internal combustion engine 10 includes an intake variable valve train 24 that varies the valve opening characteristic of an intake valve 14. The intake variable valve train 24 can switch between a dual valve variable control state, in which the operating angles of the first intake valve 14a and second intake valve 14b are variable simultaneously and continuously, and a single valve variable control state, in which the operating angle of the second intake valve 14b is continuously variable while the operating angle of the first intake valve 14a remains large. The mechanism of the intake variable valve train 24, which implements the above functionality, is not specifically defined. Various known mechanisms (e.g., a mechanism disclosed in Japanese Patent Laid-open No. 2007-16766) can be used as the intake variable valve train 24. Therefore, the detailed description of the intake variable valve train 24 is omitted from this document.

The internal combustion engine 10 shown in the figure also includes an exhaust variable valve train 26 that varies the valve opening characteristic of an exhaust valve 16. In the present invention, however, the valve opening characteristic of the exhaust valve 16 may be invariable.

The internal combustion engine 10 according to the present embodiment includes a turbocharger 28. The turbocharger 28 includes an intake compressor 28a and an exhaust turbine 28b. The intake compressor 28a is positioned in the middle of an intake path 30. The exhaust turbine 28b is positioned in the middle of an exhaust path 32.

An air flow meter 34 for detecting the intake air amount is installed in the intake path 30 that is positioned upstream of the intake compressor 28a. An inter-cooler 36 for cooling the intake air compressed by the intake compressor 28a is installed downstream of the intake compressor 28a. An intake temperature sensor 38 for detecting the intake temperature is installed downstream of the inter-cooler 36. An electronically controlled throttle valve 40 is installed downstream of the intake temperature sensor 38. A throttle position sensor 42 for detecting the opening of the throttle valve 40 is installed near the throttle valve 40.

The internal combustion engine 10 also includes an EGR path 44 that provides so-called external EGR (Exhaust Gas Recirculation) by causing part of exhaust gas in the exhaust path 32 to flow back to the intake path 30. The EGR path 44 has an EGR cooler 45 for cooling an EGR gas, an EGR valve 46 for controlling the EGR gas amount (EGR rate), and an EGR gas temperature sensor 47 for detecting the temperature of the EGR gas that has passed through the EGR cooler 46.

A catalyst 48 for purifying the exhaust gas is installed in the exhaust path 32. A catalyst temperature sensor 49 is installed in the catalyst 48 to detect its catalyst bed temperature.

The system according to the present embodiment further includes an ECU (Electronic Control Unit) 50, an accelerator position sensor 52 for detecting the position of an accelerator pedal, a crank angle sensor 54 for detecting the crank angle of the internal combustion engine 10, and a water temperature sensor 56 for detecting the cooling water temperature of the internal combustion engine 10. The ECU 50 is electrically connected to various sensors such as the intake temperature sensor 38, EGR gas temperature sensor 47, catalyst temperature sensor 49, and water temperature sensor 56, and to various actuators such as the ignition plug 18, fuel injector 22, intake variable valve train 24, throttle valve 40, and EGR valve 46. In accordance with signals fed from the sensors, the ECU 50 controls the internal combustion engine 10 by regulating the operations of the actuators.

[Features of First Embodiment]

When the operating angle of the second intake valve 14b is reduced with the intake variable valve train 24 placed in the single valve variable control state, the first intake valve 14a is set at a large operating angle with the second intake valve 14b set at a small operating angle. Thus, the first and second intake valves 14a, 14b differ in the operating angle. This state is hereinafter referred to as the "single valve small operating angle state." In the single valve small operating angle state, the intake port positioned toward the first intake valve 14a has a high flow rate, whereas the intake port positioned toward the second intake valve 14b has a low flow rate. Thus, the flow from the intake port positioned toward the first intake valve 14a exceeds the flow from the intake port positioned toward the second intake valve 14b, thereby producing a strong swirl in a cylinder.

The internal combustion engine 10 according to the present embodiment can selectively enter a operating mode for performing a combustion operation at a stoichiometric air-fuel ratio with the intake variable valve train 24 placed in the dual valve variable control state (hereinafter referred to as the "stoichiometric dual valve variable control mode"), a operating mode for performing a lean burn operation with the intake variable valve train 24 placed in the single valve small operating angle state (hereinafter referred to as the "lean single valve small operating angle mode"), and a operating mode for performing an external EGR operation with the intake variable valve train 24 placed in the single valve small operating angle state (hereinafter referred to as the "EGR single valve small operating angle mode").

In general, performing a lean burn or external EGR operation readily incurs combustion deterioration, which decreases the combustion speed and destabilizes a combustion process. The swirl achieves improvement to minimize the degree of combustion deterioration. In the lean single valve small operating angle mode or EGR single valve small operating angle mode, the internal combustion engine 10 produces a strong swirl to provide an excellent combustion state.

In the stoichiometric dual valve variable control mode, the internal combustion engine 10 can also adjust the amount of air taken into a cylinder by changing the operating angles of both intake valves 14. Therefore, the throttle valve 40 need not be used to adjust the load (torque). This makes it possible to maintain a large opening of the throttle valve 40 even when the load is low. Consequently, the pump loss can be reduced.

In the stoichiometric dual valve variable control mode, it does not matter whether or not an external EGR operation is performed. The EGR single valve small operating angle mode can introduce a larger amount of external EGR than the stoichiometric dual valve variable control mode because the former mode achieves combustion improvement by producing a strong swirl as described above.

It is assumed that the first embodiment described above and the second and third embodiments, which will be described later, switch between the stoichiometric dual valve variable control mode and lean single valve small operating angle mode. However, the present invention can also be applied to a case where switching is effected between the stoichiometric dual valve variable control mode and EGR single valve small operating angle mode.

Figure 2:
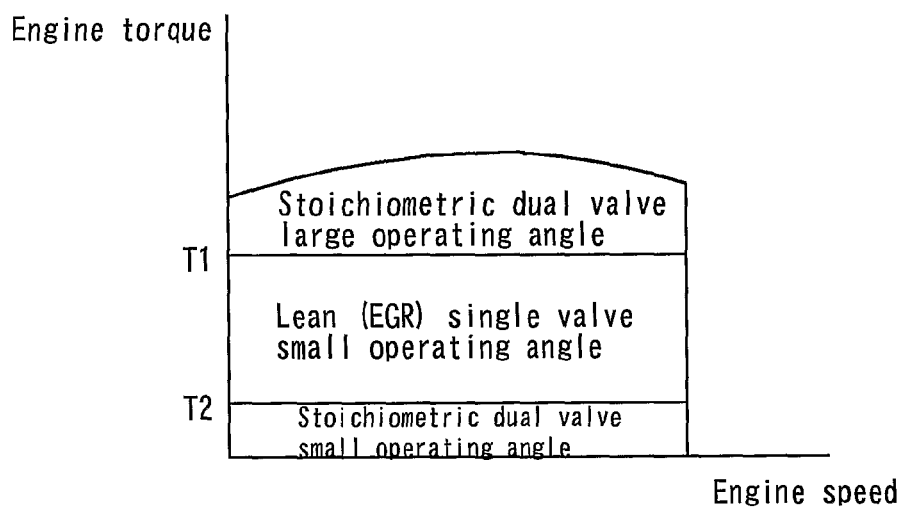
FIG. 2 is a diagram showing the relationship between the operating region and operating mode of the internal combustion engine according to the first embodiment of the present invention.

FIG. 2 is a diagram showing the relationship between the operating region and operating mode of the internal combustion engine 10 according to the present embodiment. The present embodiment assumes that the operating region of the internal combustion engine 10 is divided into a high load region, a low load region, and an extremely low load region. FIG. 2 uses T1 and T2 (T1>T2) as threshold values, and defines a region having a torque not lower than T1 as the high load region, a region having a torque lower than T1 and not lower than T2 as the low load region, and a region having a torque lower than T2 as the extremely low load region. Further, the present embodiment uses the stoichiometric dual valve variable control mode in the high load region and extremely low load region and uses the lean single valve small operating angle mode in the low load region, as shown in FIG. 2.

In the stoichiometric dual valve variable control mode, the load (torque) is adjusted by changing the operating angles of both intake valves 14 as described earlier. In the high load region, therefore, the intake valves 14 are both set at a large operating angle so that a large amount of air is acquired in accordance with the load. In the extremely low load region, on the other hand, the intake valves are both set at a small operating angle so that only a small amount of air is acquired in accordance with the load.

Figure 3:
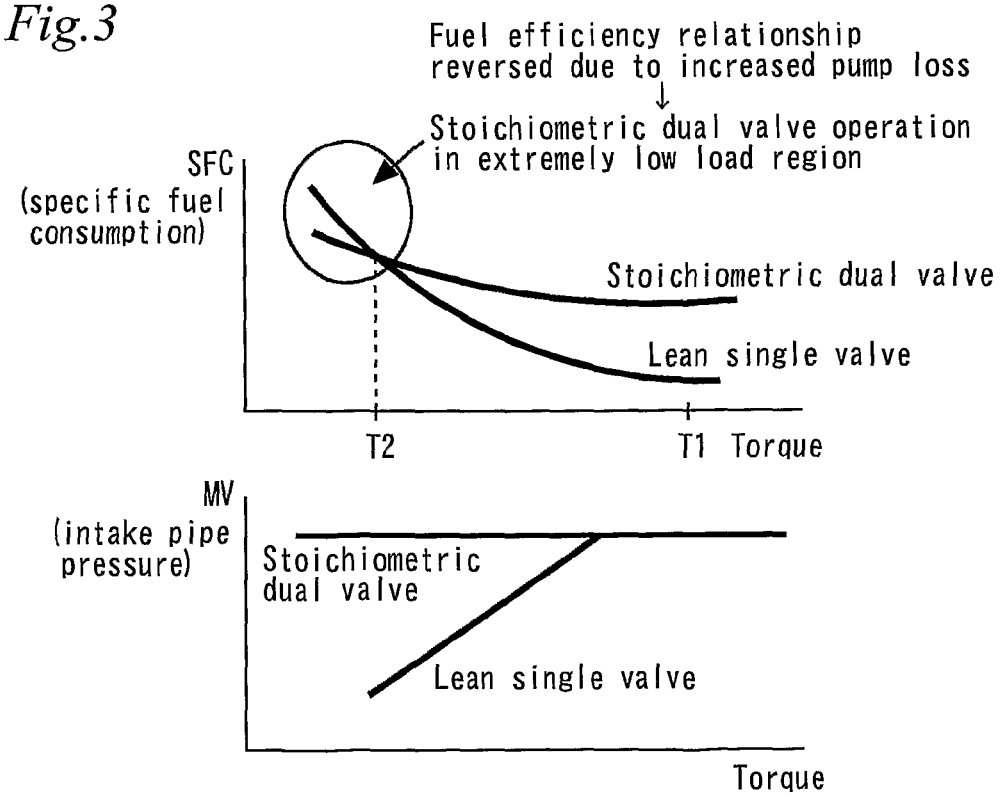
FIG. 3 shows the relationship between torque, specific fuel consumption (SFC), and intake pipe pressure.

The upper graph in FIG. 3 shows the relationship between torque and specific fuel consumption (SFC) in the low load region and extremely low load region. In the high load region where the torque is not lower than T1, the present embodiment uses the stoichiometric dual valve variable control mode because it is difficult to provide the torque in the lean single valve small operating angle mode.

In the low load region where the torque is lower than T1, on the other hand, the lean single valve small operating angle mode and stoichiometric dual valve variable control mode can be both executed. However, the lean single valve small operating angle mode exhibits a lower specific fuel consumption than the stoichiometric dual valve variable control mode in the low load region where the torque is lower than T1, as shown in the upper graph in FIG. 3. One reason is that the lean single valve small operating angle mode suffers less cooling loss than the stoichiometric dual valve variable control mode. Thus, the present embodiment uses the lean single valve small operating angle mode in the low load region where the torque is lower than T1, as mentioned earlier. This makes it possible to improve the fuel efficiency.

However, in a region where the torque is even lower, the specific fuel consumption relationship between the two modes is reversed. More specifically, the stoichiometric dual valve variable control mode exhibits a lower specific fuel consumption than the lean single valve small operating angle mode as indicated within an ellipse in the graph. The reason is as described below.

The lower graph in FIG. 3 shows the relationship between torque and intake pipe pressure. In the stoichiometric dual valve variable control mode in which the torque can be adjusted by changing the operating angles of both intake valves 14 as described earlier, the opening of the throttle valve 40 can be kept large even in a region where the torque is low. Therefore, the stoichiometric dual valve variable control mode can maintain a high intake pipe pressure even in a region where the torque is low, as shown in the lower graph in FIG. 3.

In the lean single valve small operating angle mode, on the other hand, one intake valve 14 (first intake valve 14a) is set at a large operating angle. In a region where the torque is low, therefore, it is necessary to limit the amount of air taken into a cylinder by reducing the opening of the throttle valve 40. Therefore, when the torque decreases, it is necessary to reduce the opening of the throttle valve. Consequently, when the torque decreases, the intake pipe pressure also decreases (the negative pressure increases), as shown in the lower graph in FIG. 3.

In the lean single valve small operating angle mode, therefore, the specific fuel consumption increases when the torque decreases to increase the pump loss. Consequently, the lean single valve small operating angle mode exhibits a higher specific fuel consumption than the stoichiometric dual valve variable control mode when the torque is lower that a particular value (T2), as shown in the upper graph in FIG. 3. Under these circumstances, the present embodiment uses the stoichiometric dual valve variable control mode in the extremely low load region where the torque is lower than T2, as described earlier.

As described above, the present embodiment can change the operating mode of the internal combustion engine 10 in accordance with the operating region as shown in FIG. 2 to select a operating mode in which the specific fuel consumption is minimized. This makes it possible to improve the fuel efficiency of the internal combustion engine 10.

[Details of Process Performed by First Embodiment]

Figure 4:
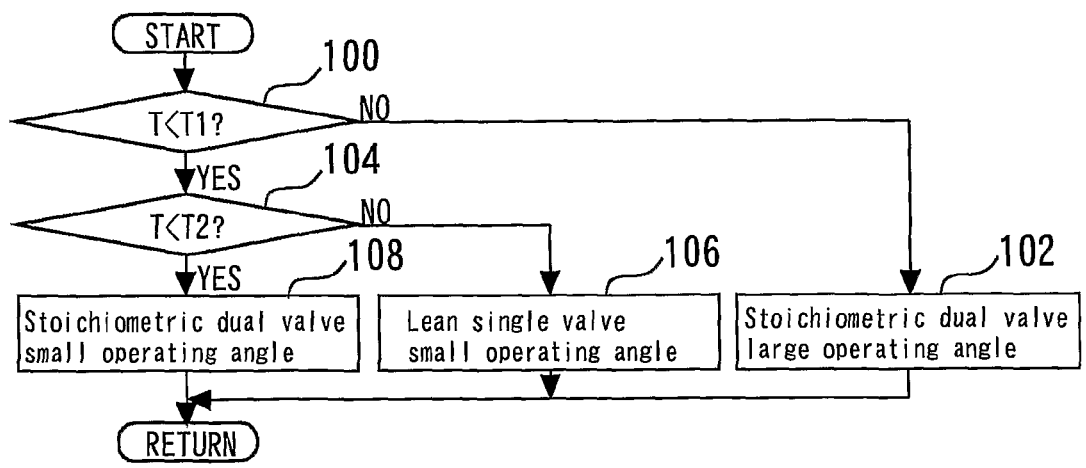
FIG. 4 is a flowchart illustrating a routine that is executed by the first embodiment of the present invention.

FIG. 4 is a flowchart showing a routine that the ECU 50 according to the present embodiment executes to implement the functionality described above. First of all, the routine shown in FIG. 4 performs step 100 to calculate load (e.g., requested torque) T in accordance, for instance, with a signal from the accelerator position sensor 52 and judge whether the load T is lower than a predetermined high load threshold value T1.

If the judgment result obtained in step 100 indicates that the load T is not lower than the high load threshold value T1 (the load T is equal to or higher than the high load threshold value T1), it can be concluded that the high load region prevails. In this instance, step 102 is followed to conduct an operation in the stoichiometric dual valve variable control mode. In step 102, control is exercised so that the operating angles of both intake valves 14 are large in accordance with the load T.

If, on the other hand, the judgment result obtained in step 100 indicates that the load T is smaller than the high load threshold value T1, step 104 is performed to judge whether the load T is lower than a low load threshold value T2. If the judgment result obtained in step 104 indicates that the load T is not lower than the low load threshold value T2 (the load T is equal to or higher than the low load threshold value T2), it can be concluded that the low load region prevails. In this instance, step 106 is followed to conduct an operation in the lean single valve small operating angle mode. In step 106, the opening of the throttle valve 40 is controlled in accordance with the load T.

If, on the other hand, the judgment result obtained in step 104 indicates that the load T is lower than the low load threshold value T2, it can be concluded that the extremely low load region prevails. In this instance, step 108 is followed to conduct an operation in the stoichiometric dual valve variable control mode. In step 108, control is exercised so that the operating angles of both intake valves 14 are small in accordance with the load T.

As described above, the present embodiment can use the stoichiometric dual valve variable control mode in the extremely low load region where the stoichiometric dual valve variable control mode exhibits a lower specific fuel consumption than the lean single valve small operating angle mode. Therefore, a operating mode in which the specific fuel consumption is minimized can be selected in both the low load region and extremely low load region. This makes it possible to provide excellent fuel efficiency.

The present embodiment assumes that the high load threshold value T1 and low load threshold value T2 are invariable without regard to the engine rotation speed as shown in FIG. 2. However, the present invention may use the functions, for instance, of the engine rotation speed as the high load threshold value T1 and low load threshold value T2.

Further, the present embodiment can select one of three different operating modes of the internal combustion engine 10, or more specifically, select the stoichiometric dual valve variable control mode, lean single valve small operating angle mode, or EGR single valve small operating angle mode. However, the present invention can also be applied to an engine that can switch between two different operating modes, that is, switch between either the lean single valve small operating angle mode or EGR single valve small operating angle mode and the stoichiometric dual valve variable control mode or to an engine that can switch to the above three different operating modes and another operating mode.

Furthermore, the internal combustion engine according to the first embodiment, which has been described above, and to the second and third embodiments, which will be described later, may not always include an external EGR device.

In the first embodiment, which has been described above, the "operating region setup means" and "operating mode control means" according to the first aspect of the present invention are implemented when the ECU 50 executes the routine shown in FIG. 4.

Second Embodiment

A second embodiment of the present invention will now be described with reference to FIGS. 5 and 6. However, the differences between the second embodiment and the first embodiment, which has been described earlier, will be mainly described while briefly describing matters common to these two embodiments or skipping the description of such matters. The second embodiment can be implemented when the system shown in FIG. 1 is used to let the ECU 50 execute a routine shown in FIG. 6.

[Features of Second Embodiment]

Figure 5:
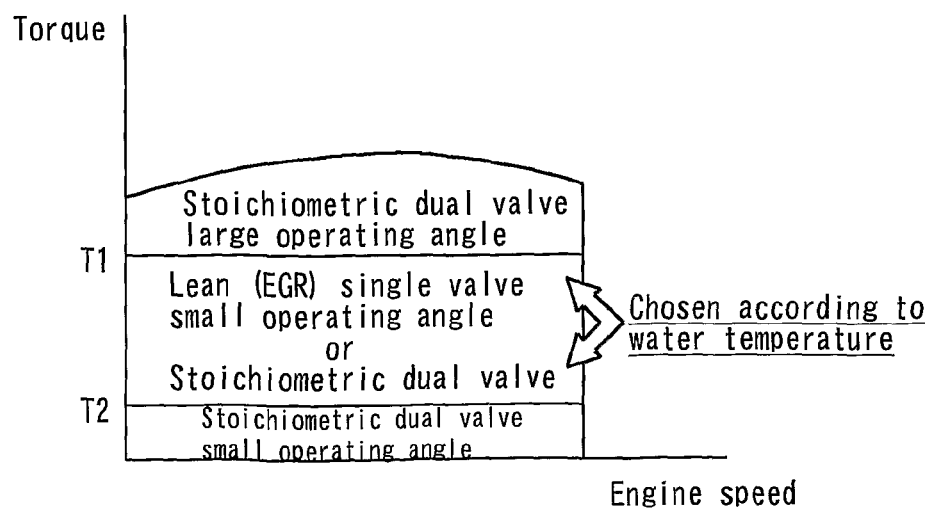
FIG. 5 is a diagram showing the relationship between the operating region and operating mode of the internal combustion engine according to a second embodiment of the present invention.

FIG. 5 is a diagram showing the relationship between the operating region and operating mode of the internal combustion engine 10 according to the present embodiment. The first embodiment, which has been described earlier, uses the lean single valve small operating angle mode in the low load region. The second embodiment, on the other hand, chooses between the lean single valve small operating angle mode and stoichiometric dual valve variable control mode in accordance with the engine cooling water temperature in the low load region as shown in FIG. 5.

In the lean single valve small operating angle mode, which provides a lower combustion temperature than the stoichiometric dual valve variable control mode, a small amount of heat is transferred from the combustion chamber to the engine cooling water and the like. Therefore, if the lean single valve small operating angle mode is used while the internal combustion engine 10 is not sufficiently warmed up, the warm-up is delayed to increase the cooling loss and friction-induced mechanical loss. This adversely affects the fuel efficiency. Further, if the lean single valve small operating angle mode is used while the warm-up is not sufficiently performed, combustion deterioration is likely to occur due to ignition performance deterioration, thereby exerting a harmful influence on driveability.

Under the above circumstances, the present embodiment uses the stoichiometric dual valve variable control mode without switching to the lean single valve small operating angle mode before the internal combustion engine 10 is warmed up to a certain extent no matter whether the low load region prevails.

[Details of Process Performed by Second Embodiment]

Figure 6:
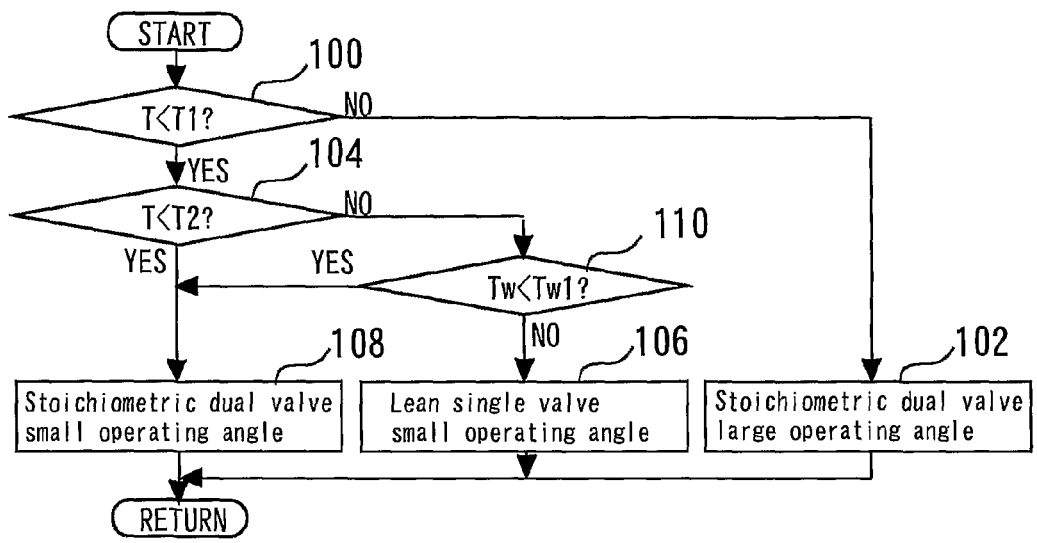
FIG. 6 is a flowchart illustrating a routine that is executed by the second embodiment of the present invention.

FIG. 6 is a flowchart showing a routine that the ECU 50 according to the present embodiment executes to implement the functionality described above. As regards the steps in FIG. 6 that are the same as those in FIG. 2, their description is omitted or abridged with the same reference numerals assigned.

If the judgment result obtained in step 104 indicates that the load T is not lower than the low load threshold value T2, that is, the low load region prevails, the routine shown in FIG. 6 performs step 110 to compare the engine cooling water temperature Tw detected by the water temperature sensor 56 against a predetermined engine water temperature threshold value Tw1.

If the comparison result obtained in step 110 indicates that the current water temperature Tw is not lower than the threshold value Tw1, it can be concluded that the internal combustion engine 10 is warmed up to the extent that entering the lean single valve small operating angle mode produces no adverse effect. In this instance, step 106 is followed to conduct an operation in the lean single valve small operating angle mode.

If, on the other hand, the comparison result obtained in step 110 indicates that the current water temperature Tw is lower than the threshold value Tw1, it can be concluded that the internal combustion engine 10 is not sufficiently warmed up to permit the entry in the lean single valve small operating angle mode. In this case, step 108 is followed to conduct an operation in the stoichiometric dual valve variable control mode.

The second embodiment, which has been described above, uses the engine cooling water temperature as the representative temperature for judging the degree of internal combustion engine warm-up. However, a temperature other than the engine cooling water temperature may also be used for judgment purposes as far as it serves as an index for determining the degree of warm-up.

In the second embodiment, which has been described above, the water temperature sensor 56 corresponds to the "temperature acquisition means" according to the second aspect of the present invention. Further, the "operating mode control means" according to the second aspect of the present invention is implemented when the ECU 50 executes the routine shown in FIG. 6.

Third Embodiment

A third embodiment of the present invention will now be described with reference to FIGS. 7 to 9. However, the differences between the third embodiment and the embodiments described earlier will be mainly described while briefly describing matters common to these embodiments or skipping the description of such matters. The third embodiment can be implemented when the system shown in FIG. 1 is used to let the ECU 50 execute a routine shown in FIG. 9.

[Features of Third Embodiment]

Figure 7:
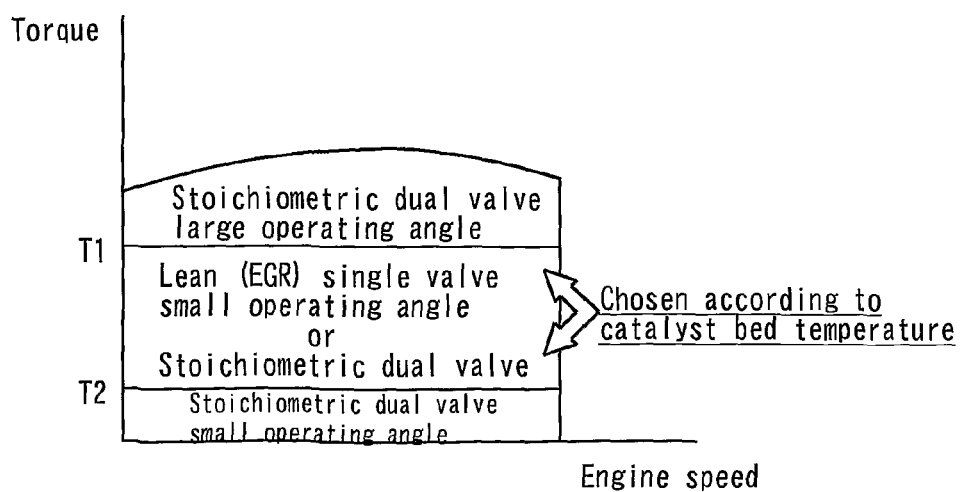
FIG. 7 is a diagram showing the relationship between the operating region and operating mode of the internal combustion engine according to a third embodiment of the present invention.

FIG. 7 is a diagram showing the relationship between the operating region and operating mode of the internal combustion engine 10 according to the present embodiment. In the low load region, the present embodiment chooses either the lean single valve small operating angle mode or stoichiometric dual valve variable control mode in accordance with the catalyst bed temperature as shown in FIG. 7.

Figure 8:
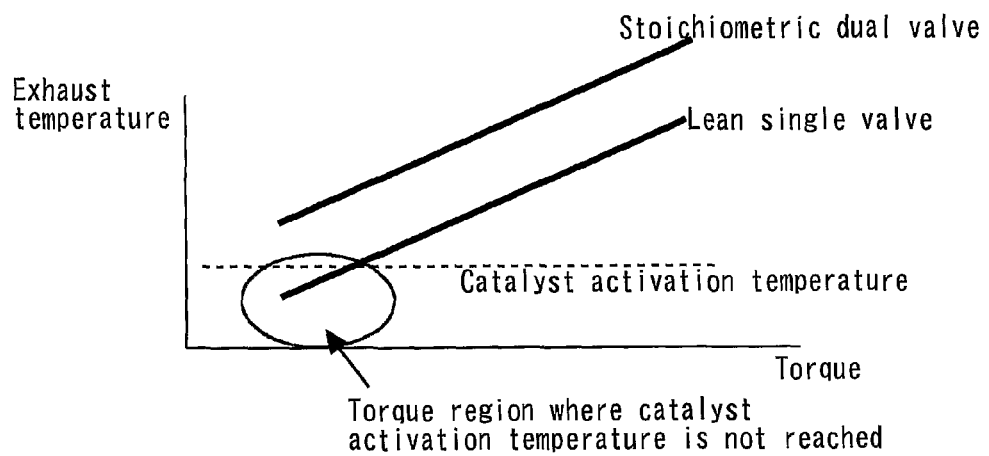
FIG. 8 shows exhaust temperatures prevailing in the lean single valve small operating angle mode and stoichiometric dual valve variable control mode.

FIG. 8 shows exhaust temperatures prevailing in the lean single valve small operating angle mode and stoichiometric dual valve variable control mode. In the lean single valve small operating angle mode in which the combustion temperature is lower than in the stoichiometric dual valve variable control mode, the exhaust gas temperature is also lower than in the stoichiometric dual valve variable control mode as shown in FIG. 8. Therefore, if the lean single valve small operating angle mode is used when the catalyst 48 is not sufficiently warmed up, the warm-up of the catalyst 48 will be delayed to adversely affect emissions.

Under the above circumstances, the present embodiment uses the stoichiometric dual valve variable control mode without switching to the lean single valve small operating angle mode before the catalyst bed temperature rises to a certain level no matter whether the low load region prevails.

[Details of Process Performed by Third Embodiment]

Figure 9:
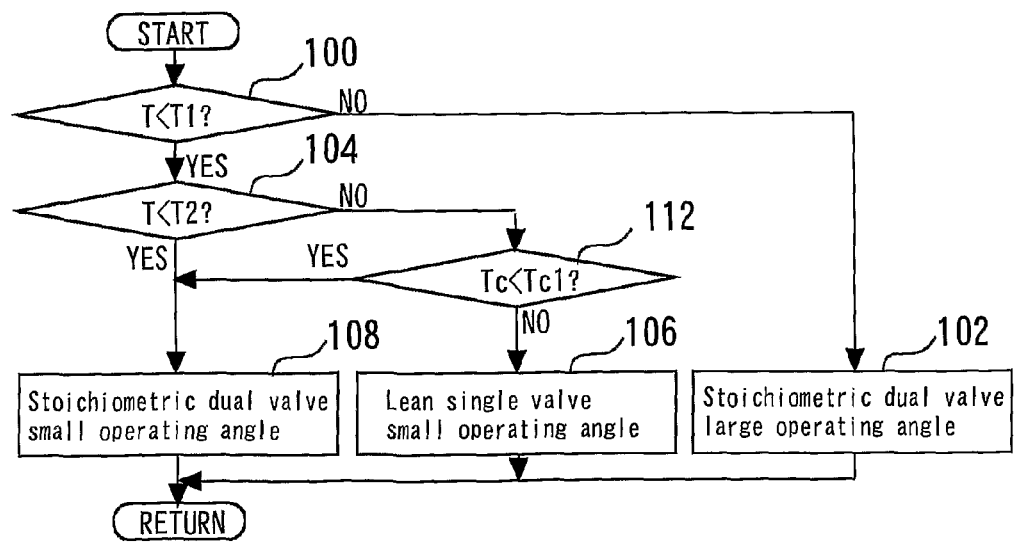
FIG. 9 is a flowchart illustrating a routine that is executed by the third embodiment of the present invention.

FIG. 9 is a flowchart showing a routine that the ECU 50 according to the present embodiment executes to implement the functionality described above. As regards the steps in FIG. 9 that are the same as those in FIG. 2, their description is omitted or abridged with the same reference numerals assigned.

If the judgment result obtained in step 104 indicates that the load T is not lower than the low load threshold value T2, that is, the low load region prevails, the routine shown in FIG. 9 performs step 112 to compare the catalyst bed temperature Tc detected by the catalyst temperature sensor 49 against a predetermined catalyst bed temperature threshold value Tc1.

If the comparison result obtained in step 112 indicates that the current catalyst bed temperature Tc is not lower than the catalyst bed temperature threshold value Tc1, it can be concluded that the use of the lean single valve small operating angle mode does not adversely affect emissions because the catalyst 48 is sufficiently warmed up. In this instance, step 106 is followed to conduct an operation in the lean single valve small operating angle mode.

If, on the other hand, the comparison result obtained in step 112 indicates that the current catalyst bed temperature Tc is lower than the catalyst bed temperature threshold value Tc1, it can be concluded that the catalyst 48 is not sufficiently warmed up. In this instance, step 108 is followed to conduct an operation in the stoichiometric dual valve variable control mode.

The third embodiment, which has been described above, directly detects the catalyst bed temperature Tc with the catalyst temperature sensor 49. Alternatively, however, the catalyst bed temperature Tc (representative catalyst temperature) may be estimated in accordance, for instance, with an operating condition history of the internal combustion engine 10 or the exhaust gas temperature.

In the third embodiment, which has been described above, the catalyst temperature sensor 49 corresponds to the "temperature acquisition means" according to the second aspect of the present invention. Further, the "operating mode control means" according to the second aspect of the present invention is implemented when the ECU 50 executes the routine shown in FIG. 9.

Fourth Embodiment

A fourth embodiment of the present invention will now be described with reference to FIGS. 10 and 11. However, the differences between the fourth embodiment and the embodiments described earlier will be mainly described while briefly describing matters common to these embodiments or skipping the description of such matters. The fourth embodiment can be implemented when the system shown in FIG. 1 is used to let the ECU 50 execute a routine shown in FIG. 11.

[Features of Fourth Embodiment]

Figure 10:
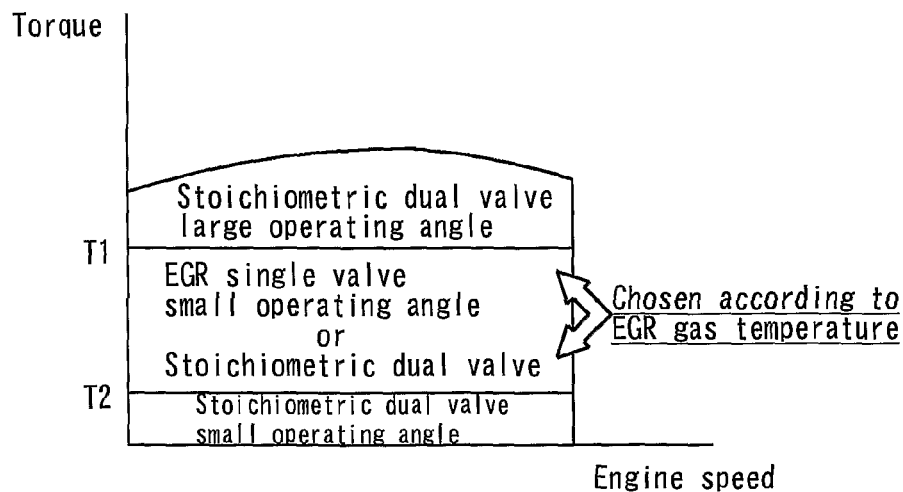
FIG. 10 is a diagram showing the relationship between the operating region and operating mode of the internal combustion engine according to a fourth embodiment of the present invention.

FIG. 10 is a diagram showing the relationship between the operating region and operating mode of the internal combustion engine 10 according to the present embodiment. As shown in FIG. 10, the present embodiment conducts an operation in the stoichiometric dual valve variable control mode in the high load region where the torque is not lower than T1 and in the extremely low load region where the torque is lower than T2. However, in the low load region where the torque is not lower than T2 but is lower than T1, the present embodiment chooses either the EGR single valve small operating angle mode or stoichiometric dual valve variable control mode in accordance with the EGR gas temperature.

If the EGR gas flowing back to the intake path 30 through the EGR path 44 has a high temperature (e.g., high rotation speed region) in the EGR single valve small operating angle mode, knocking (EGR knocking) is likely to occur due to a high compression end temperature. If knocking occurs, control is exercised to avoid knocking by retarding the ignition timing. As a result, the ignition timing becomes far from MBT (Minimum advance for the Best Torque) timing, thereby causing fuel efficiency deterioration.

Under the above circumstances, the present embodiment uses the stoichiometric dual valve variable control mode without switching to the EGR single valve small operating angle mode if the EGR gas temperature exceeds a certain point no matter whether the low load region prevails. In the stoichiometric dual valve variable control mode, which provides a lower degree of intake throttling by the throttle valve 40 than the EGR single valve small operating angle mode, it is possible to avoid an increase in the intake temperature. Consequently, the compression end temperature can be lowered. This makes it possible to absolutely inhibit the occurrence of EGR knocking even when external EGR is provided.

[Details of Process Performed by Fourth Embodiment]

Figure 11:
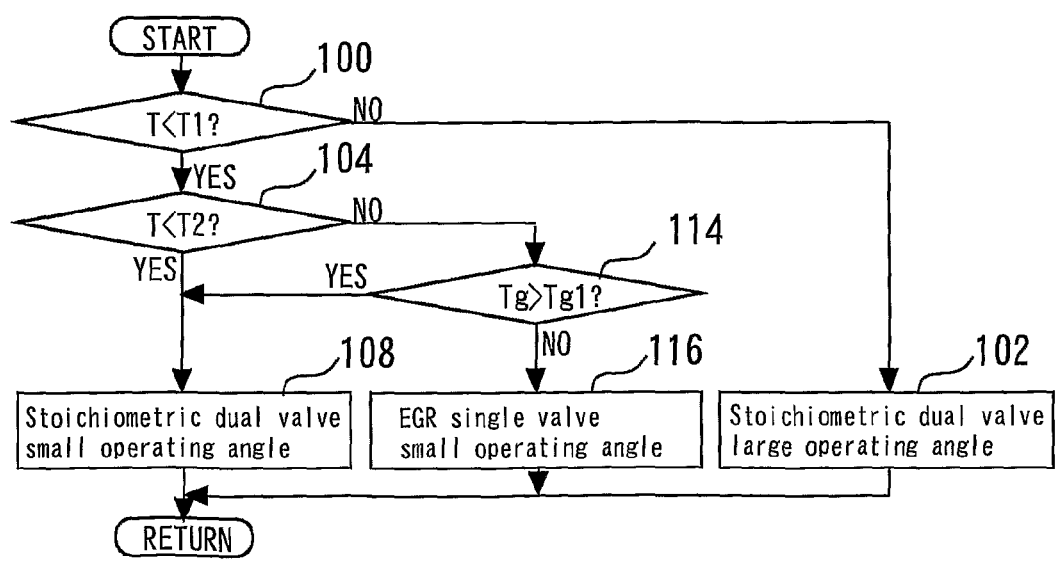
FIG. 11 is a flowchart illustrating a routine that is executed by the fourth embodiment of the present invention.

FIG. 11 is a flowchart showing a routine that the ECU 50 according to the present embodiment executes to implement the functionality described above. As regards the steps in FIG. 11 that are the same as those in FIG. 2, their description is omitted or abridged with the same reference numerals assigned.

If the judgment result obtained in step 104 indicates that the load T is not lower than the low load threshold value T2, that is, the low load region prevails, the routine shown in FIG. 11 performs step 114 to compare the EGR gas temperature Tg detected by the EGR gas temperature sensor 47 against a predetermined EGR gas temperature threshold value Tg1.

If the comparison result obtained in step 114 indicates that the current EGR gas temperature Tg is not higher than the EGR gas temperature threshold value Tg1, it can be concluded that the use of the EGR single valve small operating angle mode does not readily incur knocking or deteriorate the fuel efficiency. In this instance, step 116 is followed to conduct an operation in the EGR single valve small operating angle mode.

If, on the other hand, the comparison result obtained in step 114 indicates that the current EGR gas temperature Tg is higher than the EGR gas temperature threshold value Tg1, it can be concluded that the stoichiometric dual valve variable control mode is preferred because the EGR single valve small operating angle mode readily incurs knocking. In this instance, step 108 is followed to conduct an operation in the stoichiometric dual valve variable control mode.

The fourth embodiment, which has been described above, directly detects the EGR gas temperature Tg with the EGR gas temperature sensor 47. Alternatively, however, the EGR gas temperature Tg may be estimated in accordance, for instance, with an operating condition history of the internal combustion engine 10.

In the fourth embodiment, which has been described above, the EGR gas temperature sensor 47 corresponds to the "temperature acquisition means" according to the third aspect of the present invention. Further, the "operating mode control means" according to the third aspect of the present invention is implemented when the ECU 50 executes the routine shown in FIG. 11.

Fifth Embodiment

A fifth embodiment of the present invention will now be described with reference to FIGS. 12 and 13. However, the differences between the fifth embodiment and the embodiments described earlier will be mainly described while briefly describing matters common to these embodiments or skipping the description of such matters. The fifth embodiment can be implemented when the system shown in FIG. 1 is used to let the ECU 50 execute a routine shown in FIG. 13.

[Features of Fifth Embodiment]

Figure 12:
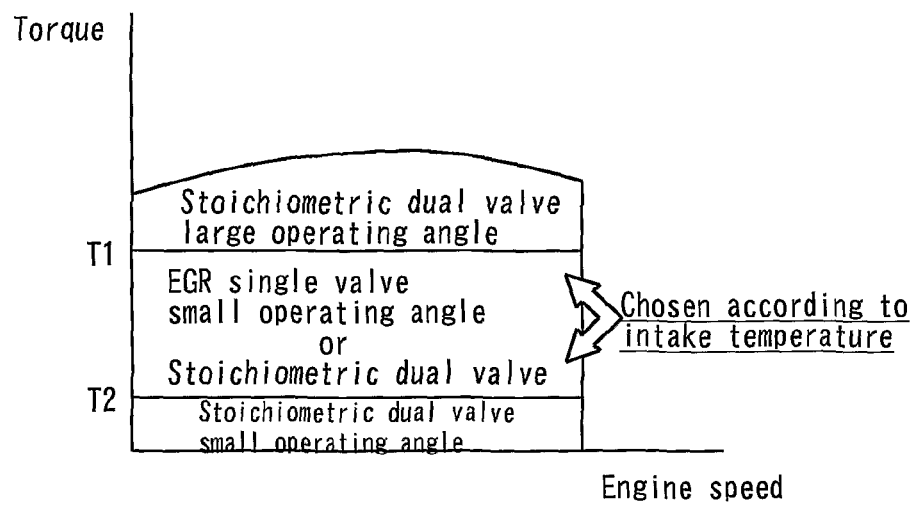
FIG. 12 is a diagram showing the relationship between the operating region and operating mode of the internal combustion engine according to a fifth embodiment of the present invention.

FIG. 12 is a diagram showing the relationship between the operating region and operating mode of the internal combustion engine 10 according to the present embodiment. As shown in FIG. 12, the present embodiment conducts an operation in the stoichiometric dual valve variable control mode in the high load region where the torque is not lower than T1 and in the extremely low load region where the torque is lower than T2. However, in the low load region where the torque is not lower than T2 but is lower than T1, the present embodiment chooses either the EGR single valve small operating angle mode or stoichiometric dual valve variable control mode in accordance with the intake temperature.

If the intake temperature is high (due, for instance, to a low vehicle speed and weak air movement against the inter-cooler 36) in the EGR single valve small operating angle mode, the compression end temperature is high so that knocking (EGR knocking) is likely to occur. As such being the case, the present embodiment uses the stoichiometric dual valve variable control mode without switching to the EGR single valve small operating angle mode if the intake temperature exceeds a certain point no matter whether the low load region prevails. In the stoichiometric dual valve variable control mode, which provides a smaller amount of valve lift for the small operating angle side than the EGR single valve small operating angle mode and can reduce the degree of intake throttling accordingly, it is possible to prevent the intake temperature from being raised by the friction with a valve. Consequently, the compression end temperature can be lowered. This makes it possible to absolutely inhibit the occurrence of EGR knocking even when external EGR is provided.

[Details of Process Performed by Fifth Embodiment]

Figure 13:
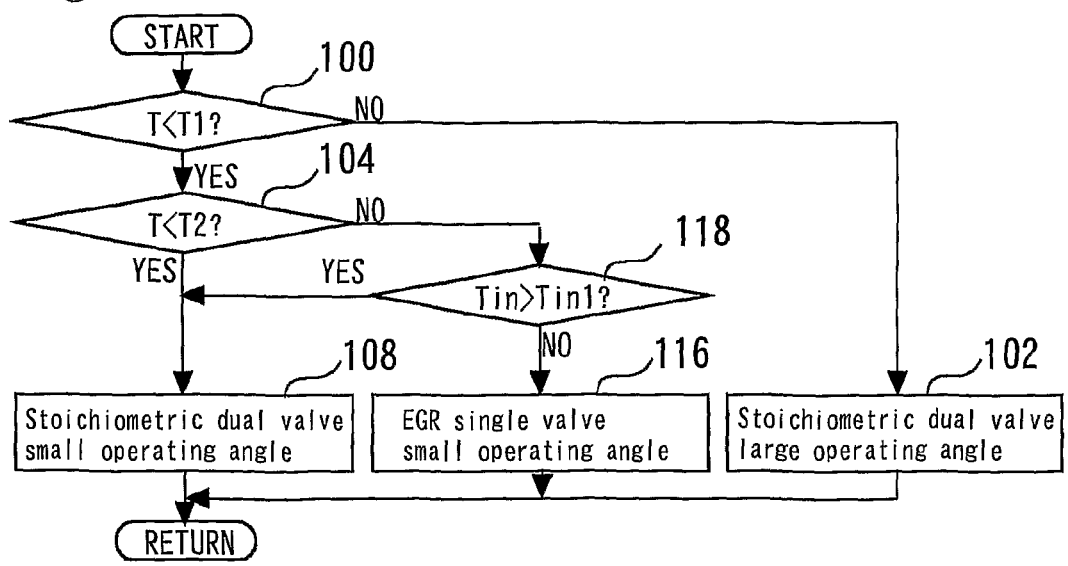
FIG. 13 is a flowchart illustrating a routine that is executed by the fifth embodiment of the present invention.

FIG. 13 is a flowchart showing a routine that the ECU 50 according to the present embodiment executes to implement the functionality described above. As regards the steps in FIG. 13 that are the same as those in FIG. 2, their description is omitted or abridged with the same reference numerals assigned.

If the judgment result obtained in step 104 indicates that the load T is not lower than the low load threshold value T2, that is, the low load region prevails, the routine shown in FIG. 13 performs step 118 to compare the intake temperature Tin detected by the intake temperature sensor 38 against a predetermined intake temperature threshold value Tin1.

If the comparison result obtained in step 118 indicates that the current intake temperature Tin is not higher than the intake temperature threshold value Tin1, it can be concluded that the use of the EGR single valve small operating angle mode does not readily incur knocking or deteriorate the fuel efficiency. In this instance, step 116 is followed to conduct an operation in the EGR single valve small operating angle mode.

If, on the other hand, the comparison result obtained in step 118 indicates that the current intake temperature Tin is higher than the intake temperature threshold value Tin1, it can be concluded that the stoichiometric dual valve variable control mode is preferred because the EGR single valve small operating angle mode readily incurs knocking. In this instance, step 108 is followed to conduct an operation in the stoichiometric dual valve variable control mode.

In the fifth embodiment, which has been described above, the intake temperature sensor 38 corresponds to the "temperature acquisition means" according to the third aspect of the present invention. Further, the "operating mode control means" according to the third aspect of the present invention is implemented when the ECU 50 executes the routine shown in FIG. 13.

In a low load state, the present embodiment chooses either the EGR single valve small operating angle mode or stoichiometric dual valve variable control mode in accordance with the intake temperature Tin. In a supercharged engine having the inter-cooler 36, however, the intake temperature Tin correlates with vehicle speed as mentioned earlier. In a low load state, therefore, the present invention may choose between the EGR single valve small operating angle mode and stoichiometric dual valve variable control mode in accordance with vehicle speed.

The invention claimed is:

1. A control device for an internal combustion engine comprising:
   an internal combustion engine having a lean burn capability and/or an external EGR capability;
   an intake variable valve train capable of switching between a dual valve variable control state, in which the operating angles of a first intake valve and a second intake valve provided for each cylinder of the internal combustion engine are both variable, and a single valve small operating angle state, in which the operating angle of the second intake valve is smaller than the operating angle of the first intake valve;
   operating region setup means for setting up at least a high load region, a low load region in which the load is lower than in the high load region, and an extremely low load region in which the load is lower than in the low load region, as a operating region for the internal combustion engine; and
   operating mode control means for using, in the high load region and the extremely low load region, a stoichiometric dual valve variable control mode to provide combustion at a theoretical air-fuel ratio in the dual valve variable control state, and using, in the low load region, a lean single valve small operating angle mode to provide a lean burn in the single valve small operating angle state or an EGR single valve small operating angle mode to provide external EGR in the single valve small operating angle state,
   wherein the low load region is a region in which the lean single valve small operating angle mode or the EGR single valve small operating angle mode exhibits a lower specific fuel consumption than the stoichiometric dual valve variable control mode, and
   the extremely low load region is a region in which the stoichiometric dual valve variable control mode exhibits a lower specific fuel consumption than the lean single valve small operating angle mode or the EGR single valve small operating angle mode.

2. The control device for an internal combustion engine according to claim 1, further comprising:
   temperature acquisition means for detecting or estimating a representative temperature of the internal combustion engine or of a catalyst installed in an exhaust path of the internal combustion engine;
   wherein, when the representative temperature is lower than a predetermined temperature, the operating mode control means uses the stoichiometric dual valve variable control mode in the low load region as well.

3. The control device for an internal combustion engine according to claim 1, further comprising:
   temperature acquisition means for detecting or estimating an EGR gas temperature or an intake temperature;

wherein, when the EGR gas temperature or the intake temperature is higher than a predetermined temperature, the operating mode control means uses the stoichiometric dual valve variable control mode in the low load region as well.

4. A control device for an internal combustion engine comprising:
an internal combustion engine having a lean burn capability and/or an external EGR capability;
an intake variable valve train capable of switching between a dual valve variable control state, in which the operating angles of a first intake valve and a second intake valve provided for each cylinder of the internal combustion engine are both variable, and a single valve small operating angle state, in which the operating angle of the second intake valve is smaller than the operating angle of the first intake valve;
an operating region setup device for setting up at least a high load region, a low load region in which the load is lower than in the high load region, and an extremely low load region in which the load is lower than in the low load region, as a operating region for the internal combustion engine; and
an operating mode control device for using, in the high load region and the extremely low load region, a stoichiometric dual valve variable control mode to provide combustion at a theoretical air-fuel ratio in the dual valve variable control state, and using, in the low load region, a lean single valve small operating angle mode to provide a lean burn in the single valve small operating angle state or an EGR single valve small operating angle mode to provide external EGR in the single valve small operating angle state, wherein the low load region is a region in which the lean single valve small operating angle mode or the EGR single valve small operating angle mode exhibits a lower specific fuel consumption than the stoichiometric dual valve variable control mode, and
the extremely low load region is a region in which the stoichiometric dual valve variable control mode exhibits a lower specific fuel consumption than the lean single valve small operating angle mode or the EGR single valve small operating angle mode.

5. The control device for an internal combustion engine according to claim 4, further comprising:
a temperature acquisition device for detecting or estimating a representative temperature of the internal combustion engine or of a catalyst installed in an exhaust path of the internal combustion engine;
wherein, when the representative temperature is lower than a predetermined temperature, the operating mode control device uses the stoichiometric dual valve variable control mode in the low load region as well.

6. The control device for an internal combustion engine according to claim 4, further comprising:
a temperature acquisition device for detecting or estimating an EGR gas temperature or an intake temperature;
wherein, when the EGR gas temperature or the intake temperature is higher than a predetermined temperature, the operating mode control device uses the stoichiometric dual valve variable control mode in the low load region as well.

* * * * *